G. S. KNAPP.
CAR-STARTER.

No. 170,175. Patented Nov. 23, 1875.

Witnesses:
Donn Twitchell.
Will H. Dodge.

Inventor:
G. S. Knapp.
By his attys
Dodge & Son.

UNITED STATES PATENT OFFICE.

GEORGE S. KNAPP, OF CHICAGO, ILLINOIS, ASSIGNOR TO THOMAS E. BENNETT AND FRED. H. LAY, OF SAME PLACE.

IMPROVEMENT IN CAR-STARTERS.

Specification forming part of Letters Patent No. 170,175, dated November 23, 1875; application filed July 23, 1875.

*To all whom it may concern:*

Be it known that I, GEORGE S. KNAPP, of Chicago, in the county of Cook and State of Illinois, have invented certain Improvements in Car-Starters, of which the following is a specification:

My invention consists in a peculiar construction and combination of parts, as hereinafter described.

Figure 1:
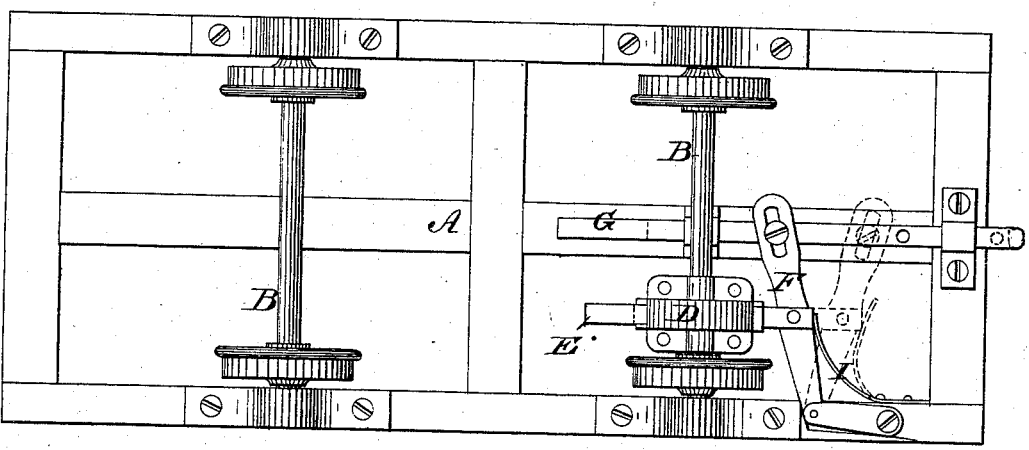
Figure 2:
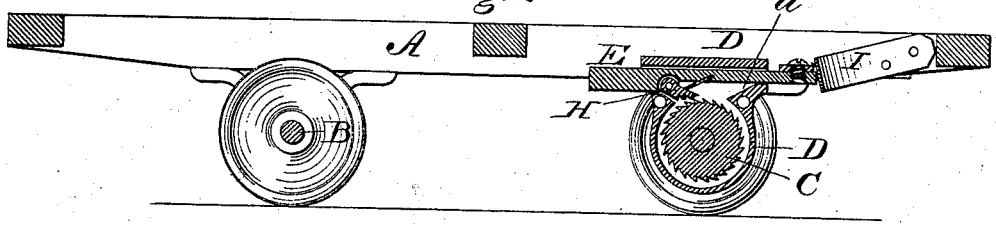
Figure 3:
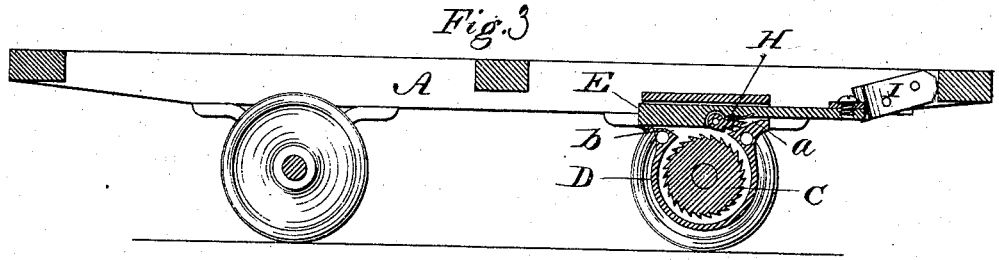
Figure 4:
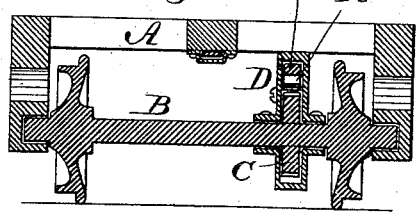

Figure 1 represents a bottom-plan view of a car provided with my improvement; Fig. 2, a longitudinal vertical section of the same with the parts in position for starting; Fig. 3, a similar view with the parts in the positions which they occupy when the car is under headway; Fig. 4, a cross-section on the line $x\ x$.

A represents the body or frame of the car, and B B the axles, mounted and provided with wheels in the ordinary manner. On the forward axle there is secured firmly a ratchet-wheel, C, which is surrounded and tightly inclosed by a metal case, D, which has its upper side flattened and secured firmly to the car-body. In the upper part of the case D there is mounted a horizontal sliding bar, E, moving lengthwise of the car, and connected, at its forward end, to the middle of a horizontal lever, F, which latter has its outer end connected by a link to the side of the frame, and its inner end connected to a draft-bar, G, sliding in guides on the middle of the car-bottom, as shown in Figs. 1, 2, and 3. To the under side of the sliding bar E there is hinged a pawl or dog, H, having its lower end provided with a series of teeth, which engage in and turn the wheel C as the bar is drawn forward.

By providing the dog with the series of teeth, forming a short rack, the strain and wear are distributed, and the dog enabled to take a better hold during a longer movement than otherwise. The dog will fall and take hold by reason of its own gravity; but, as a precautionary measure, I employ a spring to force it down, as shown, the spring being placed between the dog and the bar, which carries the same.

In the front and rear sides of the case D, respectively, there are formed two inclines, $a$ and $b$, for the purpose of raising and supporting the dog at the end of its backward and forward movements. On the frame or body there is secured a spring, I, bearing against the lever F, for the purpose of forcing the moving parts backward when the team ceases drawing.

When the car is under headway the parts stand in the positions represented in Fig. 3, the draft-bar G, the lever F, and the bar E being drawn forward, and the dog supported on the incline $a$, clear of the ratchet-wheel. As the car is brought to rest and the team ceases to draw, the spring pushes the lever and the bar E backward, carrying the dog back upon the incline $b$, which lifts it clear of the wheel, thereby preventing wear and clatter as the wheel turns forward. Upon starting the team the draw-bar, sliding forward on the car, operates the lever, which in turn slides the bar E forward, causing the dog to turn the ratchet-wheel and start the car, the arrangement and proportion of the parts being such that the force applied to urge the car forward is about double that exerted by the team, so that the car is started quite easily.

The tight case D serves not only to protect the wheel and dog, and to guide the sliding bar, but also as a reservoir to contain oil. The oil placed therein is prevented from escaping, and being taken up by the wheel is transferred to the dog, which latter applies it to the bearings of the sliding bar, so that all the working parts are kept constantly lubricated.

Having described my invention, what I claim is—

1. In combination with the ratchet-wheel C, secured upon the car-axle, the tight case D and the sliding bar E, mounted in said case and provided with the dog H, as shown.

2. In combination with the ratchet-wheel C and the sliding bar E, provided with the dog H, the case D, provided with the inclines $a$ and $b$, or either of them, substantially as and for the purpose set forth.

GEORGE S. KNAPP.

Witnesses:
MYRON H. NORTON,
THOS. E. BENNETT.